April 21, 1931.  G. T. WILLIAMS  1,802,164
LATHE
Filed Oct. 17, 1928  2 Sheets-Sheet 1
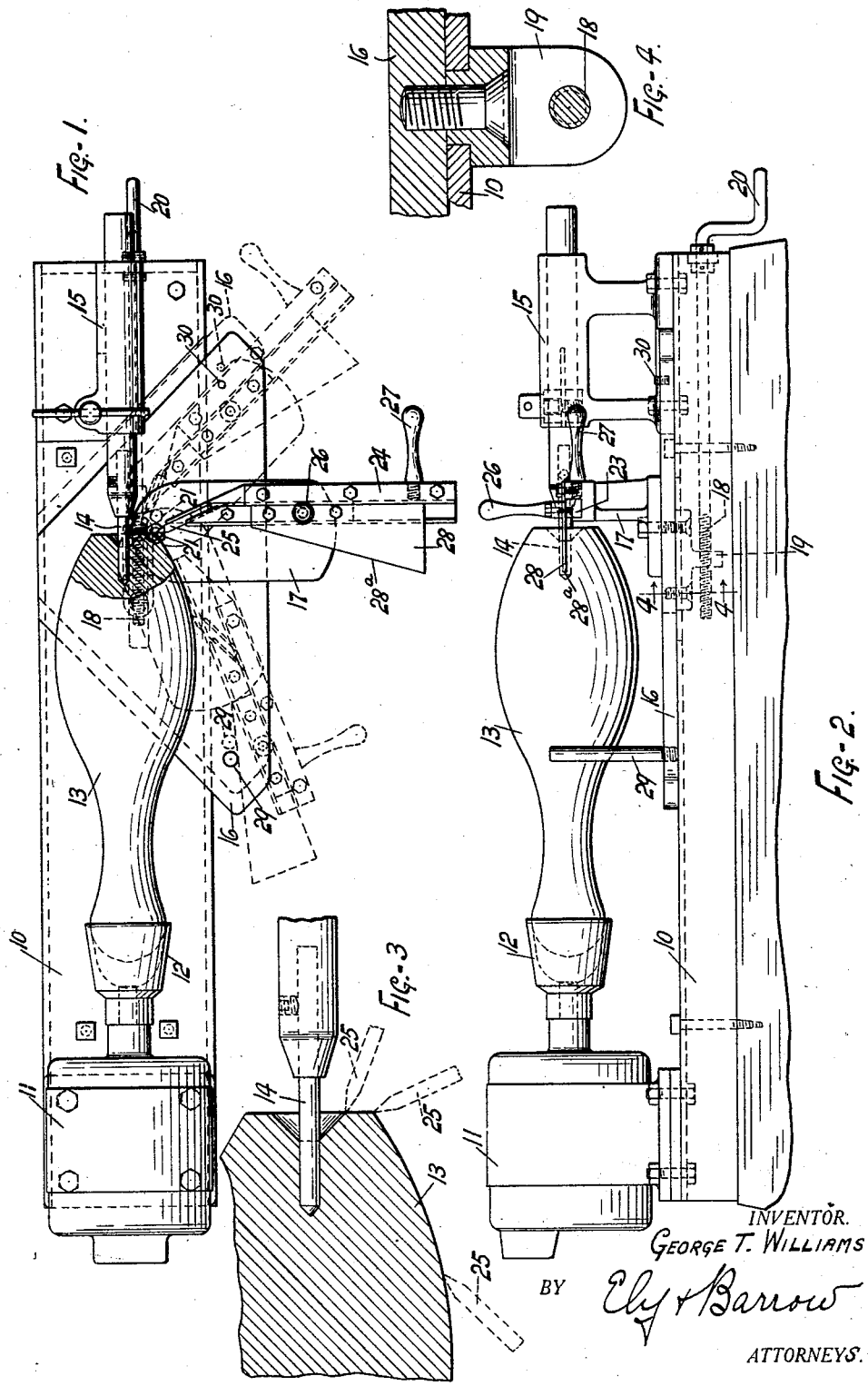
INVENTOR.
GEORGE T. WILLIAMS
BY
ATTORNEYS.

INVENTOR.
GEORGE T. WILLIAMS.
BY Ely & Barrow
ATTORNEYS.

Patented Apr. 21, 1931

1,802,164

UNITED STATES PATENT OFFICE

GEORGE T. WILLIAMS, OF AKRON, OHIO

LATHE

Application filed October 17, 1928. Serial No. 313,015.

This invention relates to improvements in lathes, and particularly to lathes for redressing tenpins.

A particular purpose of the invention is to improve upon devices of this character by the provision for cooperation with a lathe of a single dressing tool constructed, mounted and guided with relation to the work to perform all of the necessary redressing operations including redressing the base, redressing the surface of the pin adjacent the base and redressing the counter bore in the base of the pin.

The foregoing and other purposes are attained in the device illustrated in the accompanying drawings and described below. It is to be understood that the invention is not limited to the specific form thereof shown and described.

Of the accompanying drawings,

Figure 1 is a plan of apparatus embodying the invention;

Figure 2 is a front elevation thereof;

Figure 3 is a section through the base end of a tenpin showing the center engaged therein and indicating the three operations of the dressing tool thereon, the tool being indicated in dotted lines in three operative positions;

Figure 4 is a section on line 4—4 of Figure 2;

Figure 5:
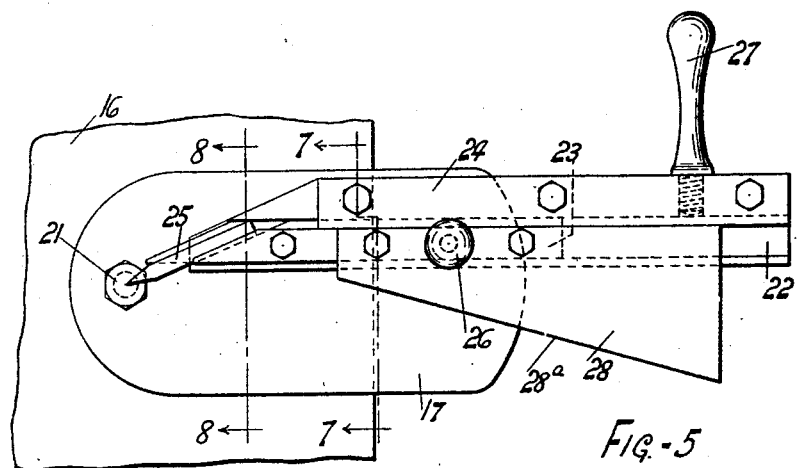
Figure 5 is an enlarged plan of the tool unit.
Figure 6:
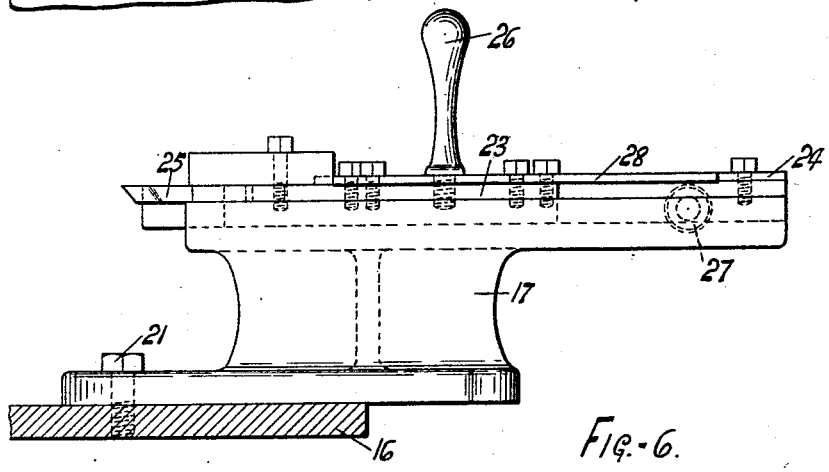
Figure 6 is an elevation thereof.
Figure 7:
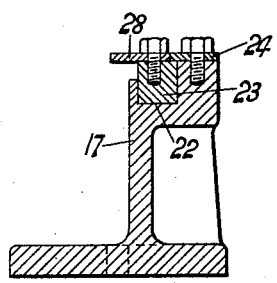
Figure 7 is a section on line 7—7 of Figure 5.
Figure 8:
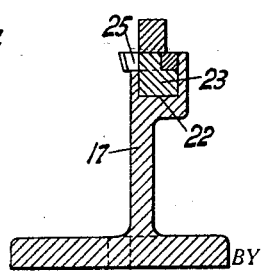
Figure 8 is a section on line 8—8 of Figure 5.

Referring to the drawings, the numeral 10 designates a bed plate preferably comprising an inverted channel having on one end thereof a motor 11 for driving a suitable chuck 12 for receiving the head of a tenpin indicated at 13, the bed plate 10 having thereon at its other end a center 14 for engaging in the usual central aperture in the base of a pin such as 13 and adjustably mounted in a bracket 15 in any suitable way.

A plate 16 is mounted on bed plate 10 for adjustment longitudinally thereof, said plate 16 supporting thereon a tool assembly 17. Adjustment of the plate 16 longitudinally of the work may be arranged for by provision of a screw 18 engageable through a threaded aperture in a lug 19 extended down through a slot in plate 10, the screw extending through the channel in the bed plate and being journaled thereon and operable by a crank 20.

This plate 16 with the parts that it carries constitutes a removable unit including a tool and means for controlling its movements, the tool assembly comprising a bracket pivoted on the adjustable plate 16 at 21 and formed with a groove 22 in its upper surface in which is slidably mounted a tool carrier 23, the carrier 23 being retained in groove 22 by a strip 24 secured on the upper side of the bracket at one side of the groove. The carrier 23 has a suitable redressing tool 25 mounted thereon and is operable by a handle 26 thereon. A handle 27 is provided for operating the bracket 17. A cam plate 28 is also secured to the carrier 23 on the side which is adjacent the work when the tool unit is swung to the left dotted line position shown in Figure 1.

The pivotal point 21 for bracket 17 is so positioned on the adjustable plate 16 as to be adjusted into alignment with a vertical tangent to the pin 13 at the base thereof whereby when a redressing cut is taken across said base and down the conical surface of the pin to the base, the area of the base will be that required or set up as a standard for tenpins and the groove 22 is so placed on the bracket that the cutting edge of the tool will be moved along a line intersecting said pivot line.

For making the dressing cut across the base of the pin bracket 17 is arranged to be swung to the full line position shown in Figure 1 and held in that position by one hand while the tool is actuated across the base of the pin with the other.

A stud 29 is arranged on plate 16 to be engaged by cam 28 when the tool is used for dressing down the conical surface of the pin 13 to the base, the edge 28$^a$ of the cam being at such an angle that as the tool is moved along toward the base of the pin with one hand and the bracket 17 is held by the other hand to hold the cam against stud 29, the resultant movement of the tool will be along a curved path to the base of the pin corresponding to the shape of this portion of the pin.

To redress the counter bore of the pin, plate 16 is adjusted by screw 18 to bring the pivot point 21 into alignment with the conical surface of the counter bore and a stud is provided at 30 on plate 16 against which bracket 17 is held by one hand to position the tool guiding groove 22 in alignment with the surface of the counter bore while the tool is moved therein.

The operation of the apparatus will be understood from the foregoing description, the redressing cuts preferably being taken in the order named while the work is continuously driven and the resulting redressed tenpin being of the required or standard base dimensions.

Obviously modifications of this invention may be resorted to without departing from the spirit thereof or the scope of the appended claims.

What is claimed is:—

1. A device for redressing tenpins comprising a lathe for receiving and rotating a pin therein, and a tool unit associated therewith, said unit including a plate, a pivot thereon, a bracket, said bracket being swingably mounted on said pivot, a tool carrier slidable on said bracket, a tool mounted on the carrier, the direction of movement of the carrier on the bracket intersecting with the pivot axis of the bracket, said pivot being adapted to be positioned in alignment with a tangent to the periphery of the pin at its base, a cam on the carrier and a stud on said plate adapted to be engaged by said cam whereby movement of the carrier on the bracket transversely of the pin will move the tool across the base of said pin and movement of the carrier on the bracket longitudinally of the pin with the cam held engaged with the stud will move the tool over a path corresponding to the shape of the lower end of the pin to redress this portion of the pin and to redress the pin to a predetermined base area, said pivot being adjustable longitudinally of the pin into alignment with the surface of the counter bore of the pin whereby the tool may also be operated to redress the counter bore.

2. The combination in a lathe, including means for supporting and rotating the work, of tool means associated therewith for operation on the work, said tool means including a pivoted bracket, a tool slidable on the bracket, a fixed stud on the lathe, cam means fixed in relation to said tool and cooperating with said stud for shifting the bracket when the tool is moved thereon so that the tool will be moved along a predetermined path corresponding to the desired shape of the work.

3. The combination in a lathe, including means for supporting and rotating the work, of tool means associated therewith for operation on the work, said means including a pivoted bracket, a tool slidingly supported by the bracket, a cam plate carried by said tool, and means cooperating with said cam to swing the bracket when the tool is moved.

4. In a lathe, a plate adapted to have longitudinal movement with respect to the axis of the lathe, a bracket pivoted to said plate, a tool slidingly supported in said bracket, and means for moving the bracket, said means being operated by the movement of the tool in the bracket.

5. In a lathe, a plate adapted to have longitudinal movement with respect to the axis of the lathe, a bracket pivoted to said plate, a tool slidingly supported in said bracket, and means operated by the movement of the tool for swinging the bracket, said means including a cam fixed in relation to said tool, and a stud on said plate cooperating with said cam.

6. A device for redressing tenpins comprising a lathe for receiving and rotating a pin therein, and a tool unit associated therewith, said unit including a plate, a bracket, a pivot on said plate upon which said bracket is swingably mounted, a tool carrier slidable on said bracket, a tool mounted on the carrier, the direction of movement of the carrier on the bracket intersecting with the pivot axis of the bracket, said pivot being adapted to be positioned in alignment with a tangent to the periphery of the pin at its base, a cam on the carrier and a stud on the plate which is adapted to be engaged by said cam whereby movement of the carrier on the bracket transversely of the pin will move the tool across the base of said pin and movement of the carrier on the bracket longitudinally of the pin with the cam held engaged with the stud will move the tool over a path corresponding to the shape of the lower end of the pin to redress this portion of the pin and to redress the pin to a predetermined base area.

GEORGE T. WILLIAMS.